United States Patent [19]

Liao

[11] Patent Number: 4,773,460
[45] Date of Patent: Sep. 27, 1988

[54] TRACTION ENHANCING DEVICE

[76] Inventor: Wan-Yiao Liao, 218 Congressional La., Rockville, Md. 20852

[21] Appl. No.: 46,683

[22] Filed: May 7, 1987

[51] Int. Cl.$^4$ .................. B60C 27/06; B60C 27/10
[52] U.S. Cl. ..................... 152/213 R; 24/70 CT; 24/70 TT; 24/115 H; 152/219; 152/221; 152/233; 152/241
[58] Field of Search .............. 152/213 A, 213 R, 219, 152/221, 241, 231, 239, 233; 24/307, 115 K, 265, 70 CT, 70 TT

[56] References Cited

U.S. PATENT DOCUMENTS 2,638,954  5/1953  Anderson ........................... 152/221
3,856,069 12/1974  Giannone ......................... 152/221 X Primary Examiner—Michael W. Ball
Assistant Examiner—Thomas Bokan
Attorney, Agent, or Firm—Birch, Stewart, Kolasch & Birch

[57] ABSTRACT

A traction enhancing device for use with a tire on a vehicle to increase traction of the tire during inclement weather is provided. A first traction enhancing member has a predetermined length for mounting around a tire of a vehicle in a position offset from a central axis of the tire. A second traction enhancing member has a predetermined length for mounting around a tire of a vehicle in a position offset from a central axis of the tire and being spaced apart and substantially parallel to the first traction enhancing member. A first connecting member has a first end affixed to said first traction enhancing member and a second end affixed to said second traction enhancing member for securing said first and second traction enhancing members together. The first connecting member is substantially orthogonally positioned relative to the first and second traction enhancing members and is disposed on a first side of the tire. A second connecting member has a first end affixed to said first traction enhancing member and a second end affixed to said second traction enhancing member for securing said first and second traction enhancing members together. The second connecting member is substantially orthogonally positioned relative to the first and second traction enhancing members and is disposed on a second side of the tire. The first and second traction enhancing members are mounted on an exterior portion extending across the tread of the tire for engagement with a road surface to increase the traction of the tire during inclement weather.

4 Claims, 2 Drawing Sheets

TRACTION ENHANCING DEVICE

BACKGROUND OF THE INVENTION

1. Field of the Invention

The present invention relates to a traction enhancing device for use together with a tire of a vehicle to increase traction of the tire during inclement weather.

2. Description of Background Art

Motorized vehicles encounter difficulty during inclement weather with respect to traction. More specifically, when road conditions are snowy, icy or slick, a vehicle experiences difficulty with respect to traction. This is particularly true during heavy snow conditions or icy conditions wherein a conventional tire on a vehicle does not produce sufficient traction to propel the vehicle along the roadway.

Snow tire chains have been developed to increase the traction of a vehicle. However, the snow tire chains are relatively cumbersome and extremely difficult to install. It often requires more than one person to install a set of snow chains. Further, it is often necessary to actually elevate a tire above the ground surface in order to properly mount the snow chains on the vehicle.

SUMMARY AND OBJECTS OF THE PRESENT INVENTION

It is an object of the present invention to provide a traction enhancing device which is relatively easy to use and may be installed on a vehicle in a matter of minutes.

Another object of the present invention is to provide a traction enhancing device which consists of a relatively few number of elements, thus making it very easy to handle by a single individual.

Still another object of the present invention is to provide a traction enhancing device which is easy to install prior to driving a vehicle into inclement weather. In addition, the traction enhancing device is easily installed on the vehicle even after emergency conditions occur.

A further object of the present invention is to provide a traction enhancing device which does not require the tire of a vehicle to be elevated in order to install the traction enhancing device on the tire.

These and other objects of the present invention are achieved by a traction enhancing device which consists of a first traction enhancing member having a predetermined length for mounting around a tire of a vehicle and extending across the tread of the tire in a position offset from a central axis of the tire. A second traction enhancing member is provided having a predetermined length for mounting around a tire of a vehicle and extending across the tread of the tire in a position offset from a central axis of the tire and spaced apart and substantially parallel to the first tire enhancing member. A first connecting member is provided having a first end affixed to the first traction enhancing member and a second end affixed to the second tire enhancing member. The first connecting member secures the first and second tire enhancing members together and is substantially orthogonally positioned relative to the first and second tire enhancing members and being disposed on a first side of the tire.

A second connecting member includes a first end affixed to the first tire enhancing member and a second end affixed to the second tire enhancing member for securing the first and second tire enhancing members together. The second connecting member is substantially orthogonally positioned relative to the first and second tire enhancing members and is disposed on a second side of the tire. The first and second tire enhancing members mounted on the exterior portion and extending across the tread of the tire engage a road surface to increase the traction of the tire during inclement weather.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRTPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
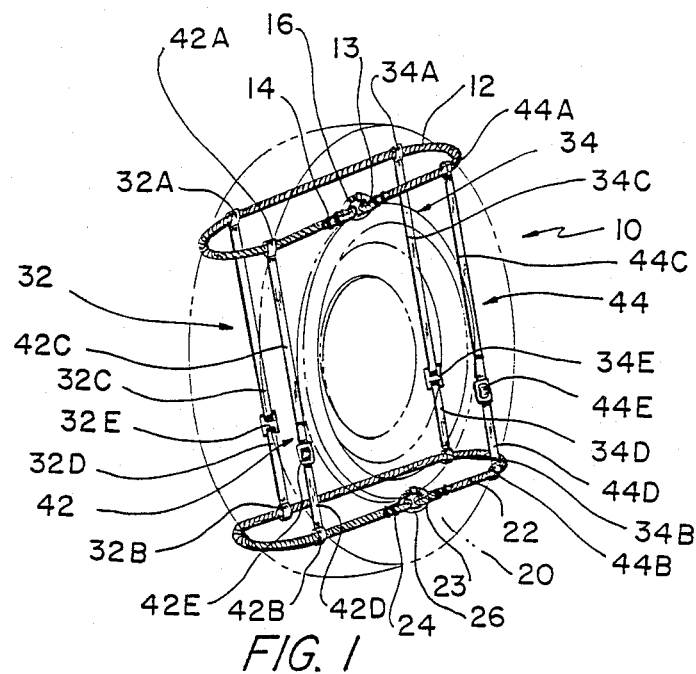
FIG. 1 is a perspective view illustrating the tire enhancing device of the present invention mounted on a tire shown in dotted lines.
Figure 2:
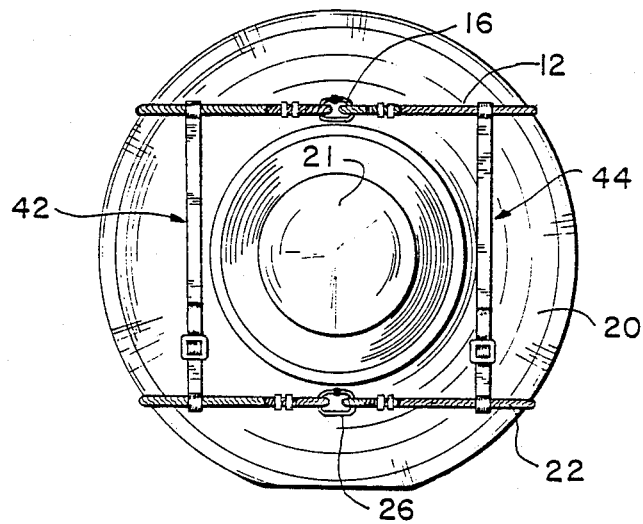
FIG. 2 is a side elevational view showing the tire enhancing device mounted on the tire and spaced relative to the axis of the tire.

FIGS. 1 and 2 illustrate a traction enhancing device 10 secured to a tire 20. The traction enhancing device 10 includes a first traction enhancing member 12 which consists of a wire rope of a predetermined length with a loop 13 secured to one end thereof. A loop 14 is secured to a second end of the first traction enhancing member 12. A C-clamp 16 is operatively positioned within the loops 13, 14 to form a circle for mounting with its ends substantially adjacent each other the first traction enhancing device 12 relative to a tire 20.

Similarly, a second traction enhancing member 22 consists of a wire rope of a predetermined length with a first loop 23 secured to a first end thereof. A loop 24 is secured to a second end of the second traction enhancing member 22. A C-clamp 26 is operatively positions within the loops 23, 24 to form a circle for mounting with its ends substantially adjacent each other the traction enhancing member 22 relative to a tire 20.

A first connecting member 32, 34 is mounted on a first side of the tire 20. The connecting member 32 is secured to the first traction enhancing member 12 by means of a loop 32A. Similarly, a connecting member portion 32D is secured to the second traction enhancing member 22 by means of a loop 32B. The connecting member 32 consists of a first portion 32C which is relatively long in length relative to a second portion 32D. A respective adjustment member 32E is provided for adjusting the distance between the first traction enhancing member 12 relative to the second traction enhancing member 22.

Similarly, the connecting member 34 includes a loop 34A secured to the first traction enhancing member 12. A loop 34B is secured to the second traction enhancing member 22. A respective adjustment member 34E is mounted to secure a first portion 34C of the connecting member 34 relative to a second portion 34D. Again, the adjusting member 34E can adjust the spacing between the first traction enhancing member 12 relative to the second traction enhancing member 22.

A second connecting member 42, 44 is mounted on a second side of the tire 20. The connecting member 42 includes a loop 42A secured to the first traction enhancing member 12. A loop 42B is secured to the second traction enhancing member 22. A respective adjusting member 42E is secured between a first member portion 42C and a second member portion 42D of the connecting member 42.

Similarly, the connecting member 44 includes a loop 44A secured to the first traction enhancing member 12. A loop 44B is secured to the second traction enhancing member 22. A respective member 44E is utilized to secure a first portion 44C relative to a second portion 44D of the connecting member 44.

Figure 3:
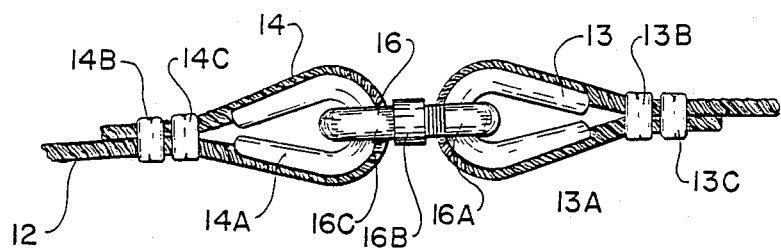
FIG. 3 is a partial view of loops secured to each end of a traction enhancing member which are secured together by means of a C-clamp.

As illustrated in FIG. 3, a C-clamp 16 is mounted to secure the loop portion 14 relative to the loop portion 13. The loop 14 may be formed by a metal insert member 14A which is mounted within a loop formed in the first traction enhancing member 12. Connectors 14B, 14C secure the end of the first traction enhancing member 12 to form a loop. Similarly, a metal insert 13A is mounted within a loop formed in an end of the traction enhancing member 12. Connectors 13B, 13C secure the end in a loop 13.

The C-clamp 16 is provided with a threaded member 16A. A nut 16B is mounted to be threaded between a gap formed in the C-clamp 16. In this manner, the C-clamp 16 can be disengaged to be removed from the loops 13, 14. When the traction enhancing member 12 is to be secured to a tire 20, the two loops can be positioned relative to each other and the C-clamp 16 mounted to secure the two loops to form a circle for mounting on the tire. The threaded nut 16B is threaded onto an end 16C of the C-clamp 16 to span the distance between the open portion of the C-clamp. In this manner, the two loop portions 13, 14 cannot be displaced relative to each other once the C-clamp 16 is secured thereto.

Figure 4:
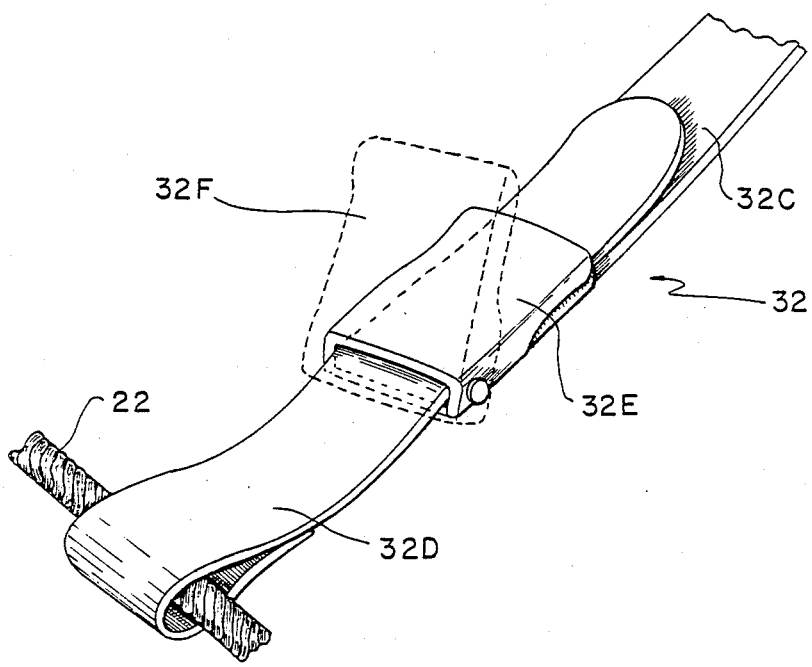
FIG. 4 is a partial view illustrating a connecting member of the present invention secured to a traction enhancing member and including an adjustment member for adjusting the length of the connecting member for securing the first traction enhancing member relative to the second traction enhancing member.

FIG. 4 illustrates a partial view of an adjusting member 32E which is mounted relative to the connecting members 32D, 32C. The connecting member 32D is secured to the second traction enhancing member 22. The connecting member 32 consists of the two portions 32C, 32D. The portion 32D is actually slid through the adjusting member 32E to secure the first traction enhancing member 12 in a predetermined relationship relative to the second traction enhancing member 22. After the two members are secured relative to each other, the lid 32F is pushed downwardly to retain the two portions 32C, 32D in a fixed relationship.

IN OPERATION

During inclement weather, an individual merely needs to take the traction enhancing device 10 and secure it to a driven tire of a vehicle. First, the first traction enhancing member 12 is secured relative to each other with the first connecting means 32, 34 secured thereto. The first traction enhancing member 12 is mounted on the top portion of a tire and the C-clamps 16 is inserted within the loops 13, 14 to mount the first traction enhancing member on the tire. Thereafter, the second traction enhancing member 22 is slipped around the lower portion of the tire and the C-clamp 26 is inserted within the loops 23, 24 to mount the second traction enhancing member on the tire.

The first connecting means 32, 34 is thereafter secured to position the first traction enhancing member 12 in a snug relationship relative to the second traction enhancing member 22. Finally, the second connecting means 42, is secured relative to each other to mount the first traction enhancing member 12 relative to the second traction enhancing member 22. The adjusting means 32E, 34E, 42E and 44E are utilized to ensure that the first traction enhancing member 12 is mounted in the correct relationship relative to the second traction enhancing member 22.

As illustrated in FIG. 2, an axle of the tire 21 is centrally disposed relative to the tire 20. The second connecting means 42, 44 are mounted on the outer side of the tire. The second connecting means 42, 44 and the first connecting means 32, 34 should be mounted so as to be disposed adjacent to the rubber portion of the tire 20.

It is to be understood that the first and second traction enhancing members 12, 22 may be constructed from a wire rope, chain or any other suitable material.

Today, cars are manufactured with either front wheel drive or rear wheel drive. The present invention contemplates mounting a pair of the traction enhancing devices on the rear wheels of rear wheel drive vehicles and on the front wheels of front wheel drive vehicles.

The members 32A, 32B, 34A, 34B, 42A, 42B, 44A, 44B may be retained relative to each other by means of a two-piece metal clip tightened by use of screws and nuts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A traction enhancing device for use with a tire on a vehicle to increase traction of the tire during inclement weather comprising:
    a first traction enhancing member having a first end and a second end spaced apart a predetermined length for mounting around a tire of a vehicle and extending across to tread of the tire in a position offset in a vertically higher elevation from a central axis of the tire relative to a ground surface on which the tire is disposed;
    a first securing means for selectively disengageably securing said first end and said second end of said first traction enhancing member together and substantially adjacent to each other to form a circle for mounting on the tire;

a second traction enhancing member having a first end and a second end spaced apart a predetermined length for mounting around a tire of a vehicle and extending across the tread of the tire in a position offset in a vertically lower elevation from the central axis of the tire relative to the ground surface on which the tire is disposed and being spaced apart and substantially parallel to said first traction enhancing member;

a second securing means for selectively securing said first end and said second end of said second traction enhancing member together and substantially adjacent to each other to form a circle for mounting on the tire;

first connecting means including a pair of straps each one of said pair of straps having a first strap portion with a first end affixed to said first traction enhancing member and a second end affixed to a respective adjusting member and a second strap portion having a first end affixed to said second traction enhancing member and a second end affixed to said respective adjusting member, said pair of straps of said first connecting means adjustably securing said first and second traction enhancing members together and being substantially orthogonally positioned relative to said first and second traction enhancing members and being disposed on a first side of the tire;

said first strap portion of each pair of straps of said first connecting means being substantially longer relative to said second strap portion for facilitating adjustment of said adjustment member and the positioning of said first traction enhancing member relative to said second traction enhancing member; and second connecting means including a pair of straps each one of said pair of straps having a first strap portion with a first end affixed to said first traction enhancing member and a second end affixed to a respective adjusting member and a second strap portion having a first end affixed to said second traction enhancing member and a second end affixed to said respective adjusting member, said pair of straps of said second connecting means adjustably securing said first and second traction enhancing members together and being substantially orthogonally positioned relative to said first and second traction enhancing members and being disposed on a second side of the tire;

said first strap portion of each pair of straps of said second connecting means being substantially longer relative to said second strap portion for facilitating adjustment of said adjustment member and the positioning of said first traction enhancing member relative to said second traction enhancing member;

wherein said first and second traction enhancing members are mounted on an exterior portion and extending across the tread of the tire for engagement with a road surface to increase the traction of the tire during inclement weather.

2. A traction enhancing device according to claim 1, wherein said first and second traction enhancing members are wire ropes.

3. A traction enhancing device according to claim 1, wherein said securing means for said first traction enhancing member and said securing means for said second traction enhancing member is a C-clamp.

4. A traction enhancing device according to claim 1, wherein said adjusting member secured to said first strap portion and said second strap portion of each pair of first connectinga means and second connecting means adjust the tension of said first and second traction enhancing members relative to said tire.

* * * * *